Nov. 8, 1966  MAMORU WATANABE  3,283,860
SERVO ACTUATED DISC BRAKING SYSTEM
Filed Dec. 3, 1964  2 Sheets-Sheet 1

INVENTOR.
Mamoru Watanabe

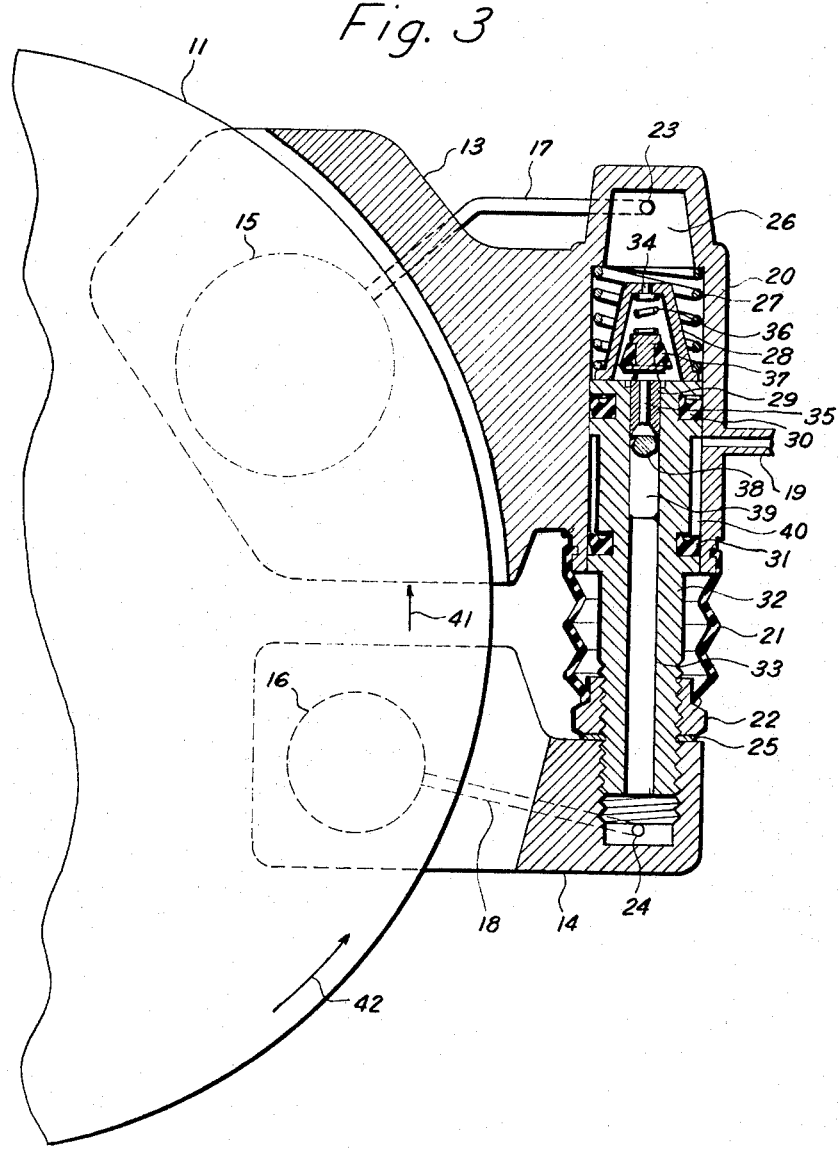

3,283,860
SERVO ACTUATED DISC BRAKING SYSTEM
Mamoru Watanabe, 16, 6-chome, Takinogawa,
Kita-ku, Tokyo, Japan
Filed Dec. 3, 1964, Ser. No. 415,763
Claims priority, application Japan, Dec. 7, 1963
38/65,685
7 Claims. (Cl. 188—152)

This invention relates to a braking system and more particularly to an emergency brake which can be used on machines, wheels, motor vehicles, and the like.

An object of this invention is to provide a braking system in which added braking force is obtained by combining the braking force of a stationary brake and the floating brake connected to it and the force from the rotational energy of the disk, instead of obtaining braking of the disk rotation by means of the non-rotating stationary brake only.

The invention will next be described with reference to the appended drawing, wherein:

FIGURE 3 shows on enlarged scale, and in section, a portion of the embodiment of FIG. 2.

Figure 1:
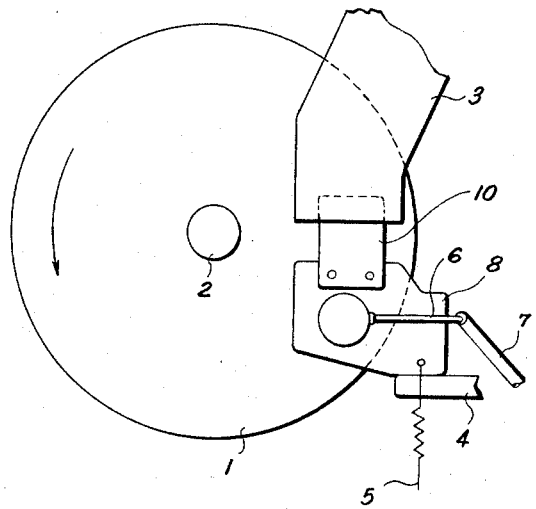
FIGURE 1 is a side view diagrammatically showing a first embodiment of braking mechanism according to the invention.
Figure 1A:
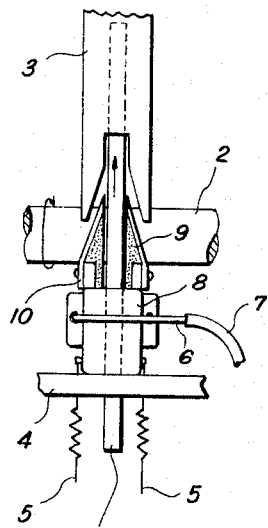
FIGURE 1a is an end view of the mechanism of FIG. 1.

In FIG. 1, 1 is a rotating disk, 2 a rotating shaft, 3 a stationary brake, 4 a stopper, 5 a return spring, 6–7 oil lines and 7 a flexible line, 8 a floating brake which houses a pressure mechanism including a pressure cylinder and a pressure piston, 9 a friction pad, and 10 is a friction pad holder. The arrow indicates the direction of rotation of the rotating disk and of the rotating shaft.

Upon brake release in this mechanism, the floating brake is urged to a return position against the stopper 4 by the force of the return spring 5 since the pressure on the rotating disk 1 by the friction pad 9 is released. During braking, pressure fluid produced by a fluid pressure generator such as a fluid compressor or a fluid pressure cylinder, is transmitted to the pressure cylinder in the floating brake 8 via oil lines 6–7. The pressure piston, as it slides toward the rotating disk 1, presses the rotating disk 1 with the friction pad 9. At this time, braking starts by the frictional resistance between the friction pad 9 and the rotating disk 1. When this frictional force overcomes the force of the return spring 5 which develops force in the opposite direction, the floating brake 8 will move away from the stopper 4 by the rotational force of the rotating disk 1 and move toward the stationary brake. The part of the friction pad 9, which approaches and reaches the stationary brake 3 is wedge shaped and produces a force similar to that produced when driving a wedge, and this force presses the friction pad 9 still further against the disk 1. In other words, it is possible to obtain a wedging force or a pressure braking force proportionate to the rotational force of the rotating disk 1, since the wedging force is of the same nature as that of the rotational force of the rotating disk 1.

Furthermore, this mechanism can be used as an emergency brake by fixing the floating brake 8 at normal times to effect braking by means of the pressure cylinder and releasing the floating brake only in time of emergency.

Figure 2:
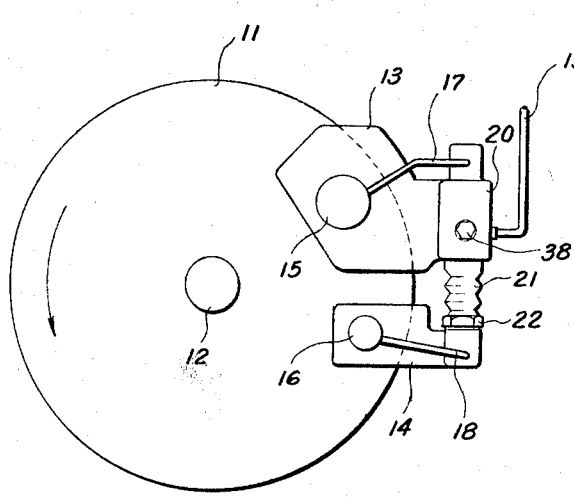
FIGURE 2 is a diagrammatic side view of a second embodiment according to the invention.
Figure 2A:
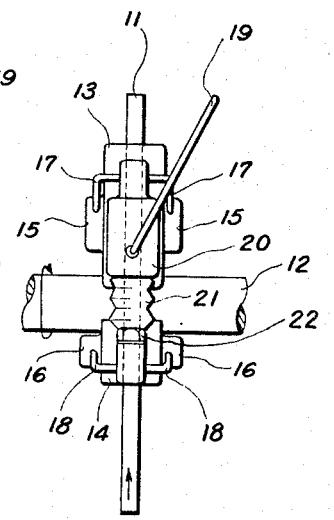
FIGURE 2a is an end view of the embodiment of FIG. 2.

FIGS. 2 and 3 show an embodiment in which a stationary brake and a floating brake are used as in FIG. 1.

In FIGS. 2 and 3, 11 is a rotating disk, 12 is a rotating shaft, 13 a stationary brake, 14 a floating brake, 15 a stationary brake pressure cylinder, 16 a floating brake pressure cylinder, 17, 18, 19 oil lines, 20 a servo cylinder, 21 a boot, 22 a lock nut, 23, 24 pressure fluid outlets, 25 a washer, 26 a pressure chamber, 27 a return spring, 28 a valve cover, 29 a valve rod, 30, 31 piston cups, 32 a servo piston, 33, 34, 35 fluid flow passages, 36 a valve spring 37 a valve, 38 a stopper, 39 a slot hole in the servo piston 32, 40 a piston oil space, 41 an arrow indicating the direction of motion of the floating brake, and 42 is an arrow indicating the direction of rotation of the rotating disk 11.

In the mechanism shown in FIG. 2 and FIG. 3, at the time of brake release the servo piston 32 in the servo cylinder 20 in back of the stationary brake 13 rests on the columnar stopper 38 fitted through the slot hole 39 and stops at the prescribed return position by the force of the return spring 27.

The outer end of the servo piston 32 is screwed to the floating brake 14 and is fixed and adjusted by the lock nut 22 and the washer 25 so that the floating brake 14 will maintain a set passing from the stationary brake 13.

At the time of braking, the pressure fluid produced by the fluid compressor or the like, is transmitted from the oil line 19 to the pressure cylinder 15 of the stationary brake 13 via the oil space 40 of the servo piston 32, the slot hole 39, fluid flow passages 35, 34, the pressure fluid outlet 23 and the oil line 17 while the pressure fluid passing from the slot hole 39 via the fluid flow passage 33, the pressure fluid outlet 24 and the oil line 18 is transmitted to the pressure cylinder 16 of the floating brake 14. Thus, the stationary brake 13 and the floating brake 14 start simultaneously to brake the rotating disk 11 by means of the friction pads on the pressure pistons provided in the pressure cylinders 15, 16. At this time, if the frictional resistance between the friction pads of the floating brake 14 and the rotating disk 11 overcomes the force of the return spring 27, the floating brake will move in the direction of the arrow 41 to approach the stationary brake 13. This motion causes the servo piston 32 fixed on the floating brake to move in the servo cylinder 20. If the servo piston 32 moves off the columnar stopper 38 fixed to the servo cylinder 20 through the slot hole 39, the valve rod is released and the valve 37 will tightly contact the servo piston 32 by the force of the valve spring 36 to close the circuit of the fluid flow passage 35. If then, the servo piston 32 moves further by the frictional resistance between the pressure mechanism of the pressure cylinder 16 of the floating brake 14 and the rotating disk 11, the fluid pressure in the pressure chamber 26 will build up to press further the pressure mechanism in the pressure cylinder 15 of the stationary brake 13 which is connected to it. Thus, the stationary brake 13 receives a secondary build-up of oil pressure which increases proportionately to the rotational force of the rotating disk 11 acting on floating brake 14 and the fluid pressure supplied from the oil line 19.

If, in this mechanism, the floating brake 14 approaches and contacts the stationary brake 13, it is necessary to provide a cushion at the point of contact between them.

What is claimed is:

1. A braking system for a rotating body comprising a stationary brake means adapted for frictionally engaging the rotating body to apply braking force thereto, a floating brake means adapted for frictionally engaging said body concurrently with said stationary brake means to also apply braking force to the rotating body, the floating brake means undergoing movement relative to the stationary brake means as a result of the friction between the floating brake means and the rotating body, piston means coupled to the floating brake means for undergoing movement therewith, said stationary and floating brake means including respective hydraulic actuator means, means defining first and second fluid paths from a supply of pressure fluid respectively to the hydraulic actuator means of the floating and stationary brake means, valve means supported with said stationary brake means for controlling the passage of pressure fluid in said fluid path which supplies the stationary brake means, said piston means being mounted for movement within the stationary brake means for engaging the valve means to close the same when floating brake means has undergone a prescribed degree of movement and close the fluid path to the actuator means of the stationary brake means such that further movement of the piston means causes increase of pressure of the pressure fluid in the closed fluid path whereby the stationary brake means exerts increased force on the rotating body.

2. A system as claimed in claim 1 wherein said piston means includes a hollow piston which is adapted for being internally supplied with pressure fluid, said valve means including a valve body slidably mounted within the piston, said body having a bore which constitutes a portion of the fluid path leading to the actuator means of the stationary braking means, and a valve member mounted on the valve body which closes said bore when the piston has undergone said prescribed displacement.

3. A system as claimed in claim 2 wherein said fluid path leading to the actuator means of the stationary braking means includes a chamber within the stationary braking means in which the piston is displaceable.

4. A system as claimed in claim 1 comprising spring means acting on the piston means to resist displacement thereof.

5. A system as claimed in claim 1 comprising spring means acting on the valve means to urge the same towards the piston means, and means acting on the valve means to maintain the same open until the piston means has undergone said prescribed movement.

6. A system as claimed in claim 5 wherein said piston means includes a piston having a longitudinal bore therethrough, said valve means including a valve body slidably mounted in the piston bore and in turn having a longitudinal bore therein which constitutes a portion of the fluid path leading to the actuator means of the stationary braking means, and a valve member mounted on the valve body for closing the bore therein when the piston has undergone said prescribed movement, said means which maintains the valve means open until the piston has undergone said prescribed movement comprising a transverse member mounted in said piston in the bore thereof and fixed to the stationary means in engagement with the valve body.

7. A system as claimed in claim 6 wherein said stationary braking means comprises a fixed housing in which the piston is slidable, said housing defining chambers at opposite ends of the piston, said means defining the first fluid path comprising a conduit leading from the chamber at one end of the piston to the actuator means of the floating brake means while the means defining the second fluid path comprises a conduit leading from the chamber at the other end of the piston to the actuator means of the stationary braking means.

References Cited by the Examiner

UNITED STATES PATENTS

| 2,494,319 | 1/1950 | Swan | 188—141 |
| 2,596,556 | 5/1952 | Sollerith. | |
| 3,044,580 | 7/1962 | Butler | 188—140 |
| 3,167,158 | 1/1965 | Brownyer | 188—141 |
| 3,173,517 | 3/1965 | Powlas | 188—152 |

FOREIGN PATENTS 917,424  9/1946  France.

MILTON BUCHLER, *Primary Examiner.*

G. E. A. HALVOSA, *Assistant Examiner.*